March 10, 1953
L. SAIVES
2,630,724
MACHINE TOOL CARRIER
Filed Dec. 10, 1947
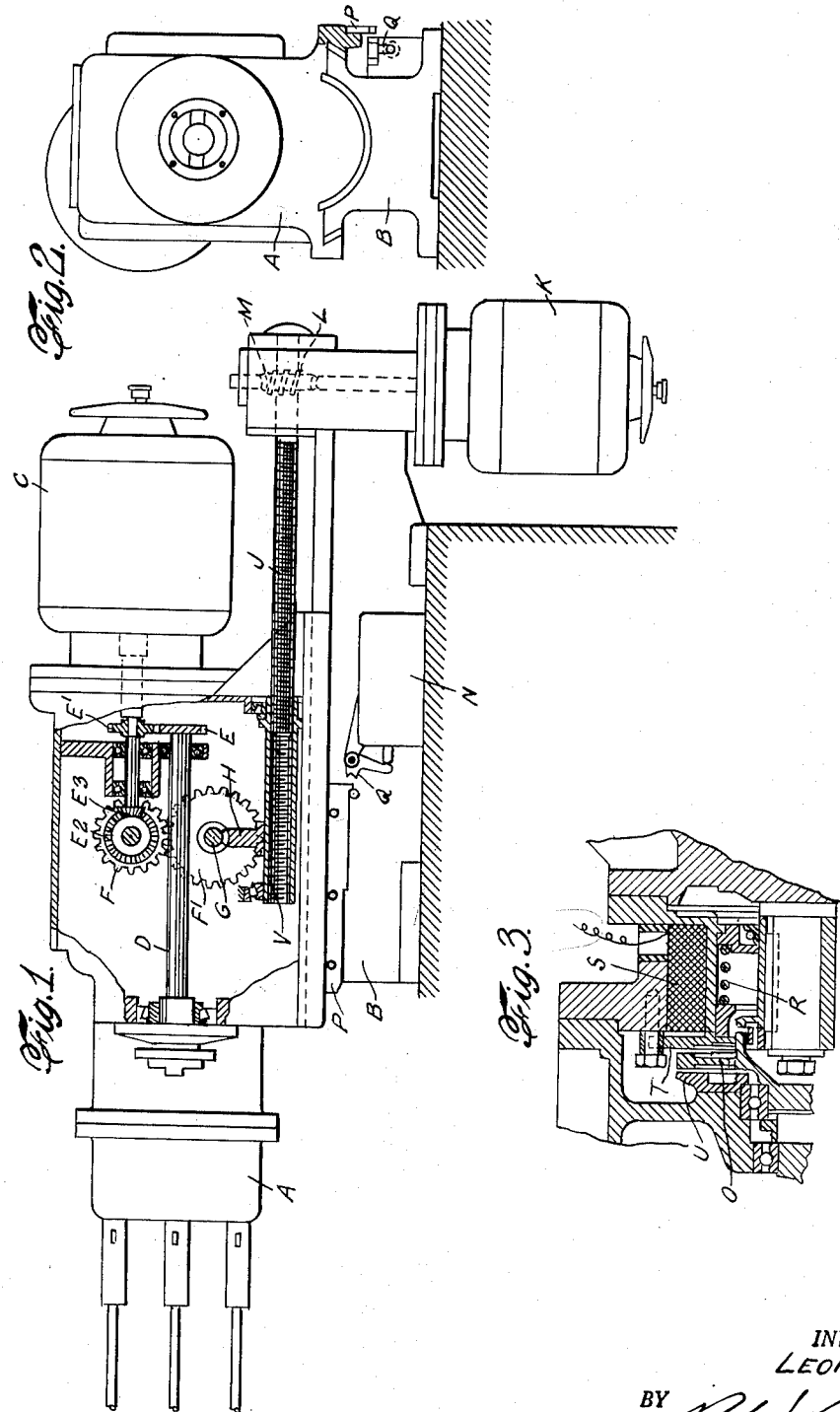
INVENTOR.
LEON SAIVES
BY
ATTORNEY Patented Mar. 10, 1953

2,630,724

UNITED STATES PATENT OFFICE 2,630,724

MACHINE-TOOL CARRIER

Léon Saives, Billancourt, France, assignor to Regie Nationale des Usines Renault, Billancourt, France Application December 10, 1947, Serial No. 790,803
In France December 30, 1946

2 Claims. (Cl. 77—34.4)

This invention relates to improvements in machine tools and concerns more particularly a movable head which is adapted to receive a single tool spindle or multiple spindles for tools adapted to carry out drilling, reaming, screw-tapping, milling and like operations.

Machine tool carriers are already known in which the rotation of the tool carrier spindle is effected by means of an electric motor, while the slow or rapid feed of the spindle is provided by another electric motor.

The head according to the present invention comprises a movable spindle-supporting frame mounted on a fixed slide, and is more particularly characterised by the fact that an electric motor which rotates the tool carrier spindle or spindles through suitable gearing effects at the same time a slow working feed or return motion of the spindle-supporting frame, while a rapid translational movement of the spindles in one direction or the other is obtained by means of a second electric motor.

According to a further feature of the invention, the said slow feed or return motion is imparted by the first electric motor to the movable frame by means of one or more pairs of pinions, for example bevel wheels, which transmit the motion to a system comprising a worm and a worm wheel, the said worm wheel being connected to the said frame and to a nut which is in engagement with a fixed screw of corresponding pitch, so that the rotation of the nut brings about a slow translational movement of the spindle-supporting frame.

According to a further feature, the fixed screw with which the slow-feed nut co-operates can be rotated by a second electric motor, so that in this case the nut of the movable frame, the rotational movement of which is controlled by the first motor, receives a much more rapid translational movement than in the preceding case, the screw being adapted to be driven in either direction. In this way, a rapid feed motion is obtained in addition to the slow feed motion obtained by the screw and nut system.

The invention also provides a safety system intended to limit the effort applied to the nut during the slow feed motion and constituted by a dog having an inclined surface which is mounted on the axis of the screw.

According to the invention, the stopping and the rotation of the motors hereinbefore referred to are controlled by means of relays actuated by a distributor comprising a plurality of contacts on the side of the fixed slide.

For this purpose, a cam connected to the movable spindle-supporting frame moves past a lever through which it imparts to the distributor the necessary positions for causing the head to carry out the various operations constituting the working cycle.

Finally, in accordance with the invention, an electro-magnetic brake may be provided on the motor controlling the rapid translational movement so as to hold the motor fast during the slow feed operation, the braking couple exerted being greater than the working couple, and so as to render irreversible the control of the rapid feed screw by the motor, which is in this case preferably effected by means of cylindrical pinions.

In order that the invention may be more fully understood, it will now be described in greater detail with reference to the accompanying drawings, which show, by way of example, devices according to the invention, and in which:

Figure 1 is a diagrammatic elevation of an electro-mechanical head according to the invention, Figure 2 is an end view, and Figure 3 shows on a larger scale an electromagnetic brake disposed between the motor and the means for controlling the rapid feed screw.

Referring to Figure 1, it will be seen that the head illustrated comprises a moveable spindle-supporting frame A and a fixed slide B on which the frame is guided by dovetails.

A motor C rotates the tool carrier spindle D through associated pinions $E^1$, E adapted to act as a reducing gear to reduce the speed of the spindle. The shaft of the motor C also drives, through a pair of bevel wheels $E^3$, $E^2$, and a further pair of pinions F, $F^1$, a worm G meshing with a worm wheel H, and a nut I mounted on a sleeve V connected to the worm wheel H.

A safety system constituted by a dog having inclined faces, which dog is mounted on the axis of the worm, limits the effort which can be applied to the nut I when the resistance offered by the workpiece to the feed of the spindle exceeds a certain limit. The same dog system can also serve as a stop device for truing operations where it is necessary to work to an exact depth. The nut I co-operates with a long screw J supported by the fixed slide B, while the nut I is mounted by means of the sleeve V on the movable frame A.

It will thus be seen that the rotation of the motor C produces rotation both of the spindle D and of the nut I and consequently the slow feed motion of the frame A on the slide B, the screw H being fixed.

On the other hand, a second motor K can rotate the screw J through an irreversible couple formed by a worm L and a worm wheel M carried by the screw J. The rotation of the screw J causes a rapid translational movement in either direction, according to the direction of rotation of the screw J, of the nut I and therefore of the movable frame A on the slide B.

The rotation and the stoppage of the motors C and K are controlled by relays actuated by a distributor N comprising a plurality of contacts, which distributor is situated at the side of the fixed slide B. A cam P secured to the side of the movable frame A moves past a lever Q through which it imparts to the distributor N the necessary positions for causing the head to carry out the various operations constituting the working cycle.

In this way, it is sufficient to modify the contacts situated in the distributor N and the relays which it controls in order to change the working cycle of the machine without having to change any mechanical part of the head. However, it is possible, by simply reversing the direction of rotation of one of the pair of bevel wheels $E^3$, $E^2$, to reverse the direction of rotation of the spindle D or, by inversion of these bevel wheels on their spindles, to obtain two feeding speeds suitable, for example, one for drilling feed and the other for tapping.

A preferred modification of the invention is illustrated in Figure 3. It consists in replacing the irreversible control comprising the worm L and the worm M, by a control by means of spur wheels by disposing between the motor K and this control an electromagnetic brake device mounted on the shaft of the motor, which enables the output to be improved and the rapid feed and return movements to be more accurately limited.

This device comprises a spring R which acts on a non-rotatable disc T, when the motor is at rest, so as to cause a disc O keyed on the driving shaft to be gripped between the disc T and a cheek U.

When the motor is set in operation, this brake is released by means of a direct-current electromagnet S which attracts the disc T against the action of the spring R.

The braking couple thus exerted must naturally be greater than the couple exerted on the fixed screw during operations.

According to a further modification, this device could be eliminated by employing a motor brake having a sliding armature which itself effects the braking in the inoperative position.

Modifications and variations are naturally possible in the device described without departing from the invention, in particular with regard to the cam controlling the distributor and the system for driving the rapid feed screw.

I claim:

1. A machine tool comprising a bed, a tool carrier frame on said bed, a tool carrier on said frame, a rotatable spindle for driving said tool carrier, a first electric motor for driving said spindle, a shaft rotatable by said first motor, a first gear train operatively connecting said shaft and said spindle for effecting rotation of the spindle in direct response to the rotation of said shaft, a feed screw on said bed in axially non-movable relation thereto, a nut mounted for axial movement with said frame and threadedly engaged with said feed screw, a second gear train independent of said first gear train operatively connecting the shaft of said first motor and said nut, said second gear train including a pair of interchangeable interengaging bevel gears of different diameters, one of said bevel gears being connected to said motor shaft, whereby the gear ratio between the first motor and the nut may be changed without affecting the gear ratio between the motor and the spindle and said tool carrier may be driven at two different selected speeds solely by rotation of said first motor at a predetermined constant speed, a second electric motor, and a third gear train operatively connecting said second motor and said feed screw for effecting rotation thereof with respect to said nut whereby a rapid translational movement of said tool carrier may be effected, said first motor and said second motor being arranged for both independent and concurrent operation.

2. A machine tool as defined in claim 1 further comprising an electrical switching device for controlling the operation of said motors in accordance with predetermined cyclical steps, lever means for operating said switching device and cam means on said frame disposed to engage said lever during translational movement of said frame, said cam means having a lever engaging face arranged to depress said lever in successively varying degrees.

LÉON SAIVES.

REFERENCES CITED

The following references are of record in the file of this patent:

UNITED STATES PATENTS

| Number | Name | Date |
|---|---|---|
| 2,023,841 | Kingsbury | Dec. 10, 1935 |
| 2,054,760 | Oberhoffken | Sept. 15, 1936 |
| 2,333,341 | Scrivener | Nov. 2, 1943 |